US010832398B2

(12) United States Patent
Porret et al.

(10) Patent No.: US 10,832,398 B2
(45) Date of Patent: Nov. 10, 2020

(54) METHOD OF INSPECTING THE QUALITY OF BLANKS, IN PARTICULAR OF BLANKS TO BE PROCESSED INTO PACKAGING MATERIAL, AND QUALITY INSPECTION SYSTEM

(71) Applicant: BOBST MEX SA, Mex (CH)

(72) Inventors: Olivier Porret, Lussery-Villars (CH); Mario Bellino, Orbe (CH); Jeronimo Alonso, Epalinges (CH); Claude Toma, Crissier (CH)

(73) Assignee: BOBST MEX SA (CH)

(*) Notice: Subject to any disclaimer, the term of this patent is extended or adjusted under 35 U.S.C. 154(b) by 50 days.

(21) Appl. No.: 16/098,486

(22) PCT Filed: May 11, 2017

(86) PCT No.: PCT/EP2017/025119
§ 371 (c)(1),
(2) Date: Nov. 2, 2018

(87) PCT Pub. No.: WO2017/194201
PCT Pub. Date: Nov. 16, 2017

(65) Prior Publication Data
US 2019/0147576 A1 May 16, 2019

(30) Foreign Application Priority Data

May 13, 2016 (EP) .................................... 16169645

(51) Int. Cl.
G06T 7/00 (2017.01)
(52) U.S. Cl.
CPC .... G06T 7/001 (2013.01); G06T 2207/20021 (2013.01); G06T 2207/20081 (2013.01);
(Continued)

(58) Field of Classification Search
None
See application file for complete search history.

(56) References Cited

U.S. PATENT DOCUMENTS

| 5,365,596 A | 11/1994 | Dante et al. ...................... 382/8 |
| 8,073,239 B1 | 12/2011 | Bahrami et al. ............... 382/143 |
| 2010/0039510 A1* | 2/2010 | Gold .................. G06Q 30/0603 348/92 |

FOREIGN PATENT DOCUMENTS

| WO | WO 2014/042280 A1 | 3/2014 |
| WO | WO 2014/108460 A2 | 7/2014 |

OTHER PUBLICATIONS

International Search Report dated Jul. 28, 2017 in corresponding PCT International Application No. PCT/EP2017/025119.
(Continued)

Primary Examiner — David Perlman
(74) Attorney, Agent, or Firm — Ostrolenk Faber LLP

(57) ABSTRACT

A method of inspecting the quality of blanks ($2_n$) to be processed into packaging material, includes the following steps: A carrier (1) with a plurality of blanks ($2_n$) is supplied. Each blank ($2_n$) is identified in accordance with its position (n) on the carrier (1), and a scanned image ($S_n$) of each blank (2) is obtained, and each scanned image ($S_n$) is compared with a reference image ($R_n$) associated with the specific position (n) of the blank ($2_n$) from which the image was taken. Based on the result of the comparison, the respective blank ($2_n$) is accepted or rejected. Furthermore, there is a quality inspection system (10) comprising a digital imaging unit (12) for scanning images of blanks ($2_n$) on a sheet (1), a unit (16) for generating individual reference images for each blank, a storage (18) for storing the individual reference images ($R_n$), and a comparator (20) for comparing scanned images ($S_n$) of a blank with the individual reference image ($R_n$) for this blank ($2_n$).

12 Claims, 2 Drawing Sheets

(52) U.S. Cl.
CPC ............... *G06T 2207/30124* (2013.01); *G06T 2207/30144* (2013.01)

(56) References Cited

OTHER PUBLICATIONS

Written Opinion dated Jul. 28, 2017 in corresponding PCT International Application No. PCT/EP2017/025119.

\* cited by examiner

METHOD OF INSPECTING THE QUALITY OF BLANKS, IN PARTICULAR OF BLANKS TO BE PROCESSED INTO PACKAGING MATERIAL, AND QUALITY INSPECTION SYSTEM

CROSS-REFERENCE TO RELATED APPLICATIONS

The present application is a 35 U.S.C. §§ 371 national phase conversion of PCT/EP2017/025119, filed May 11, 2017, which claims priority of European Patent Application No. 16169645.5, filed May 13, 2016, the contents of which are incorporated by reference herein. The PCT International Application was published in the English language.

The invention relates to a method of inspecting the quality of blanks, in particular blanks to be processed into packaging material such as boxes or bags, and to a quality inspection system.

Packaging material for packaging goods are made from blanks which are first printed and then processed, for example into a box. In the following, reference will be made to boxes, but the invention relates to other forms of packaging material as well.

Typically, a plurality of blanks is printed on a carrier (a sheet or web of material from which the boxes are made, e.g. cardboard or paper). In the following, the term "sheet" is being used for easier reference, but it is to be kept in mind that this term also encompasses a carrier in the form of a web.

After being printed, the blanks are cut from the sheet and supplied to a processing station where they are folded, glued or otherwise processed so as to obtain the desired box.

The process of printing the blanks on the sheet can comprise conventional printing, but also may comprise the application of a foil and/or a hologram, an embossing, a creasing, the production of folded edges and/or incisions. All these steps randomly introduce certain variations and tolerances which will impact the precision with which the different printed features are aligned with respect to each other (e.g. the precision with which the edges of a hologram register with folded edges or an applied foil registers with embossed portions). Depending on the size of the particular printed features and their proximity to adjacent features, an offset potentially smaller than 0.1 mm can already be clearly visible for a consumer. Furthermore, it is to be kept in mind that an offset might change during operation of a printing machine. As a result, the quality of the blanks provided by a perfectly adjusted printing machine might change over the time.

It is known to use an inspection system which uses a reference image (sometimes called "golden template") with which the printed sheet is compared. If the difference between the golden template and the printed sheet is below a predefined threshold, the quality of the sheet is considered to be good, and the blanks of the respective sheet are processed into boxes. If the difference between the golden template and the printed sheet is above a predefined threshold, the quality of the sheet is considered as insufficient, and the sheet is discarded.

The golden template can be formed based on printing data, e.g. as a pdf image which represents the theoretical image of the sheet with the blanks. As an alternative, the golden template can be formed by superimposing a plurality of sheets with printed blanks which have been judged by an operator as being of good quality.

While the known inspection system is generally very helpful in identifying sheets which carry blanks of insufficient quality, it has been found out that there are situations in which sheets are incorrectly accepted or rejected.

SUMMARY OF THE INVENTION

The object of the invention is to improve the accuracy with which a determination between good and insufficient quality is being made.

In order to accomplish this object, the invention provides a method of inspecting the quality of blanks, in particular of blanks to be processed into packaging material, comprising the following steps: A carrier with a plurality of blanks is supplied. Then, each blank is identified in accordance with its position on the carrier, and a scanned image of each blank is obtained. Each image is compared with a reference image associated with the specific position of the blank from which the image was taken. Based on the result of the comparison, the respective blank is accepted or rejected. Furthermore, the invention provides a quality inspection system which comprises a digital imaging unit for scanning images of blanks on a sheet, a unit for generating individual reference images for each blank, a storage for storing the individual reference images, and a comparator for comparing scanned images of a blank with the individual reference image for this blank.

The invention is based on the idea of comparing each individual blank on a sheet with its own dedicated reference image. This idea is based on the recognition that the tolerances and process variations for the blanks are not identical but are different for the different positions of the blank on the sheet. Using individual, dedicated reference images ("golden templates") for each position of a blank on a sheet avoids a problem associated with the prior art inspection approach, namely a loss in sensitivity due to generating the golden template by scanning complete sheets. By doing so, the prior art golden template superimposes interprocess register variations and quality control degradation of the contours of printed materials and/or foils with or without embossing for all blanks on one sheet at the same time.

By contrast, when the reference image is created for each position of the blank on the sheet individually, only the variations occurring for the respective position of the blank affect the particular reference image, while the variations occurring for blanks at other positions on the sheet do not affect the particular reference image. This results in a plurality of advantages:

Inter-blanks register variations between informative and/or decorative designs such as, but not limited to, variable printed zone, holograms, embossing, creasing and printing, do not affect the reference image. This allows a finer measurement of any deviations in print-to-process register.

A better sharpness in the shape quality analysis of stamping foils, embossing and creasing is provided.

Detection of small occlusions or missing character parts in negative text printing from stamping is possible.

A control and analysis of variable print is possible.

Depending on external requirements, the quality inspection can be made online or offline.

It is possible to have the inspection system automatically identify the different blanks on a sheet simply based on their position on the sheet. Preferably however, a mark indicative of the position of the blank on the carrier is associated with each blank. In other words, a number or a letter is printed adjacent each blank. This allows an operator to very easily identify the blank on a sheet for which any action is to be taken.

Preferably, the reference image is generated in a learning phase by superimposing a plurality of scanned images of produced blanks which have a good quality. Thus, it is ensured that the reference image generated for each specific blank on the sheet "comprises" the tolerances and variations which are inherently associated with this position only, thereby creating a reference image which is unique for each position of the blank on the sheet.

According to an embodiment of the invention, a preliminary reference image ("master") is based on printing data. In other words, the preliminary reference image corresponds to image data which is being used for the printing process. Thus, the preliminary reference image is the image of a printed blank which does not have any of the tolerances or variations inevitably associated with the printing process. This type of reference image can in particular be used in an early learning step in which the inspection system collects image data for creating the reference images individualized for each position of the blank on the sheet.

As an alternative, an operator decides which blanks are being used for creating the individual reference images. This allows making a decision whether or not the color of the blanks corresponds to the intended color.

Preferably, the learning phase is repeated in intervals. In view of the fact that the tolerances and variations which occur during the printing process change during production of the blanks, it is advantageous to "update" the reference image from time to time.

According to an embodiment of the invention, the result of the comparison is being used for statistical evaluations and/or for identifying problems in the production of the blanks. The inspection system can thereby monitor if there is a specific blank for which the printing quality is significantly below average so that an operator can appropriately intervene.

The blanks can comprise different printed features, for example a printed zone, a hologram, an embossing and/or a fold edge. The inspection system and the inspection method allow precisely assessing whether or not these features are correctly aligned with respect to each other.

The invention will now be described with reference to the enclosed drawings. In the drawings,

DESCRIPTION OF EMBODIMENTS

Figure 1:
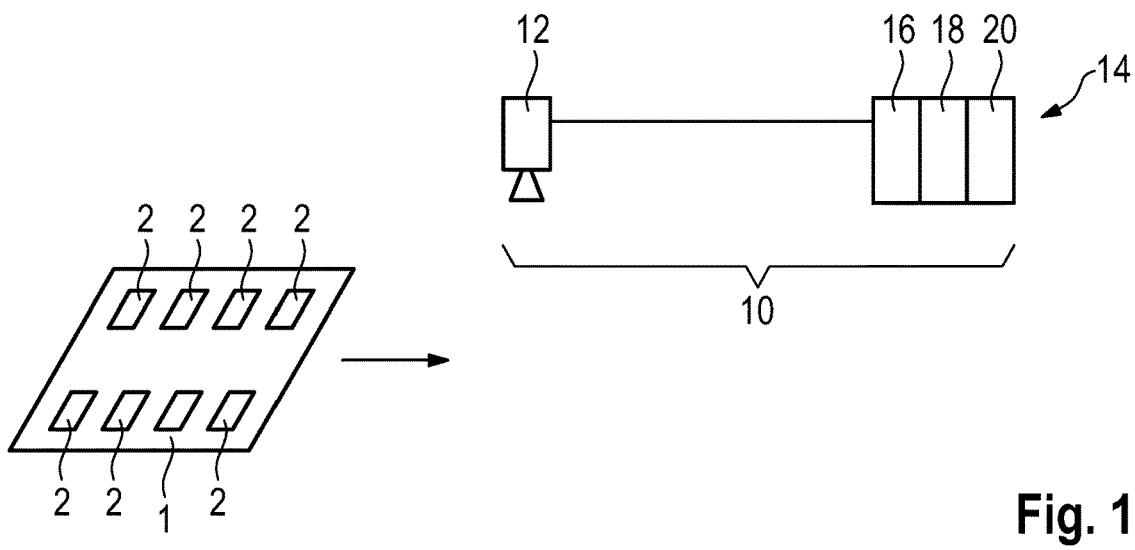
FIG. 1 schematically shows a quality inspection system according to the invention for performing the inspection method according to the invention.

In FIG. 1, a printed carrier or sheet 1 can be seen which is supplied to a schematically shown quality inspection system 10.

The printed sheet 1 comprises a plurality of blanks 2 which later are to be processed into packaging material. Here, it is boxes, but it could be bags or other items as well. The sheet 1 is formed from the material of the boxes to be produced later, e.g. from cardboard, paper or a similar suitable material.

Even though the sheet is here shown as comprising a specific length, it can be an "endless" web as well.

Each blank comprises a plurality of printed features. "Printed features" are in a first instance conventional printed portions, but can also be an applied foil or an applied hologram. Further, the printed feature can be varnish, an embossing, a creasing, folded edge and/or incisions.

Figure 2:
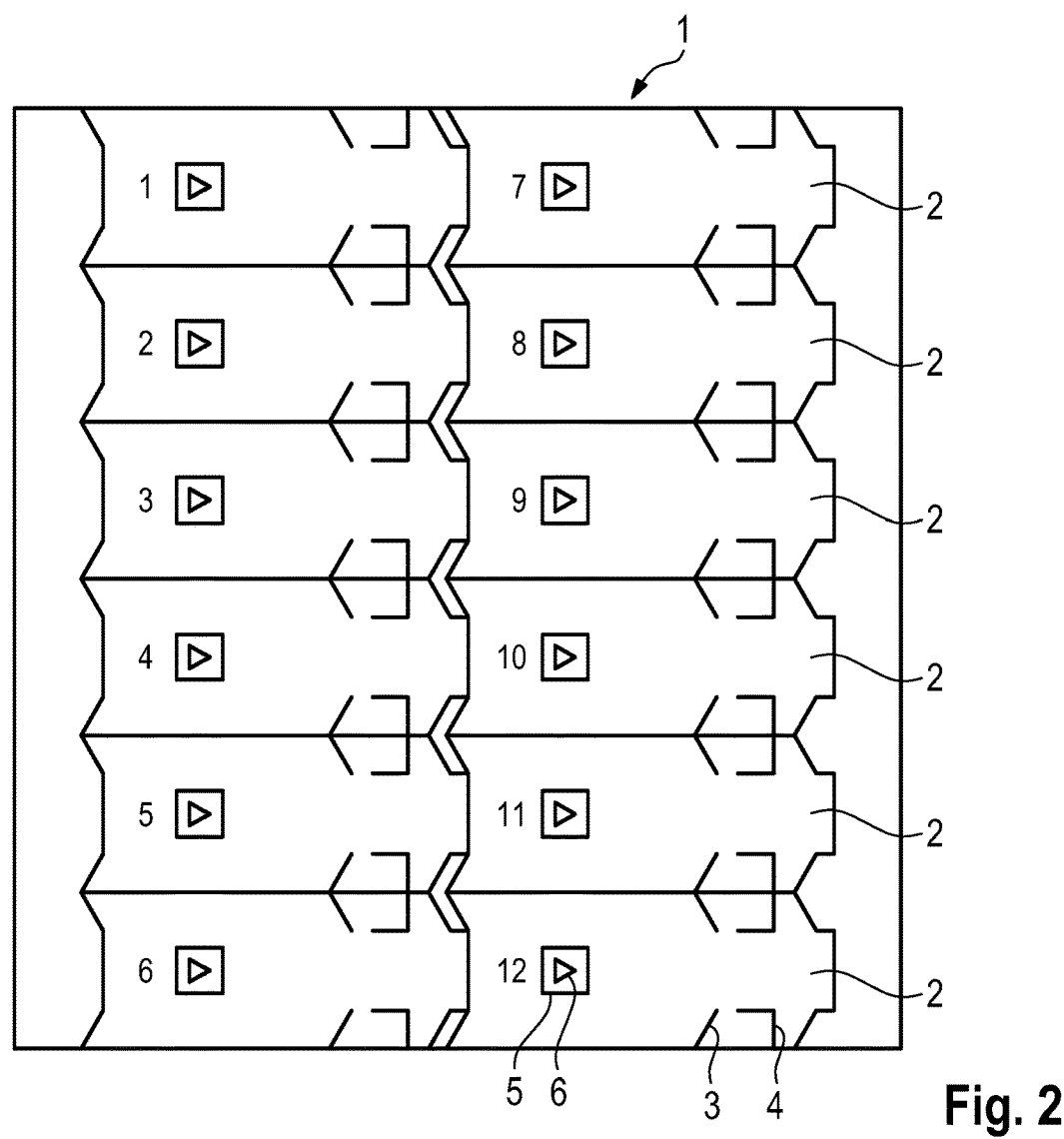
FIG. 2 schematically shows a top view of a sheet which comprises a plurality of printed blanks.

By way of example, each of the printed blanks in FIG. 2 comprises a plurality of folded edges 3, incisions 4, a rectangular print 5 and a triangular hologram 6 applied within the rectangular print 5.

It is important to note that each of the blanks 1 is associated with an identification which here is a number. In the embodiment shown, there are twelve blanks 2 on each sheet 1, which are numbered consecutively from 1 to 12. Thus, the blanks can be designated as blanks $2_1, 2_2, \ldots 2_{12}$.

In order to obtain a box having the desired quality, it is important that the various printed features are correctly aligned with respect to each other. This is particularly important for printed features which are arranged very close to other features. As an example, should a print be misaligned with respect to a closely adjacent edge of a box, even small misalignments potentially of 0.1 mm are visible to a consumer.

The quality inspection system 10 allows determining whether or not the printed blanks $2_1, 2_2, \ldots 2_{12}$ can be accepted or have to be discarded in case the quality of the print is not sufficient. To this end, the quality inspection system 10 comprises a digital imaging unit 12 for scanning images $S_n$ of the blanks $2_1, 2_2, \ldots 2_{12}$ on sheet 1. The digital imaging unit 12 can be a camera, in particular a line camera or a 2D camera (area camera).

Further, the quality inspection system comprises a control 14 in which a unit 16 for generating individual reference images $R_n$ for each blank 2, a storage 18 for storing the individual reference images $R_n$ and a comparator 20 for comparing scanned images $S_n$ of a blank $2n$ with the individual reference image $R_n$ for this blank are implemented.

In a first step for setting up the quality inspection system 10, a preliminary reference image ("master") for each of the blanks is stored in the storage 18. This preliminary reference image can be obtained based on printing data. Thus, it can be a pdf file with the image of a complete, perfect blank 2

An alternative way of obtaining the master is to run the machine and have it scan a printed blank 2 which was considered by the operator as being of good quality. The advantage of using a master which was "approved" by an operator is that an operator is able to take into account, when making the assessment whether or not the printed blank should be used as the master, if the color is as it should be.

A key feature of the quality inspection system 10 is that, in a fully operative condition, storage 18 contains an individual reference image $R_n$ for each of the blanks $2_n$ which can be found on sheet 1. In the example shown in the drawings, storage 18 thus contains twelve reference images $R_1, R_2, \ldots R_{12}$ for the blanks $2_1, 2_2, \ldots 2_{12}$.

These individual reference images $R_1, R_2, \ldots R_{12}$ are created by scanning, in a learning phase of the system, a predefined number of sheets 1 with printed blanks $2_1, 2_2, \ldots 2_{12}$ of good quality, and by superimposing the scanned images $S_1, S_2, \ldots S_{12}$ of the individual blanks $2_1$, $2_2, \ldots 2_{12}$. As an example, for creating reference image $R_1$, for blank 2 carrying identification number 1, twenty scanned images $S_1$ of blank $2_1$ are superimposed, and the resulting image is stored as individual reference image $R_1$ for this blank $2_1$ in storage 18. In the same manner, the individual reference images $R_2$ to $R_{12}$ for the remaining blanks $2_2$ to $2_{12}$ are being created and stored.

Figure 3:
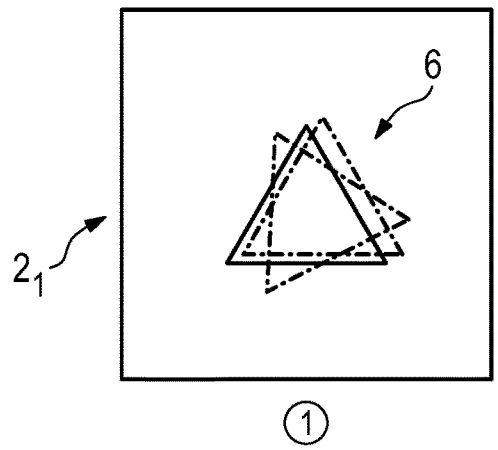
FIG. 3 schematically shows in a superimposed manner scanned images of a printed exemplary feature for a blank on a first position on the sheet.

FIG. 3 schematically shows a portion of three scanned images of blank $2_1$, namely the portion with the triangular hologram 6 of FIG. 2. A first image shown in a continuous line represents the hologram 6 in the "perfect" position, a second image shown in a dashed lined represents the hologram 6 displaced to the right, and a third image shown in a chain dotted line represents the hologram 6 rotated in a counter-clockwise direction.

Figure 4:
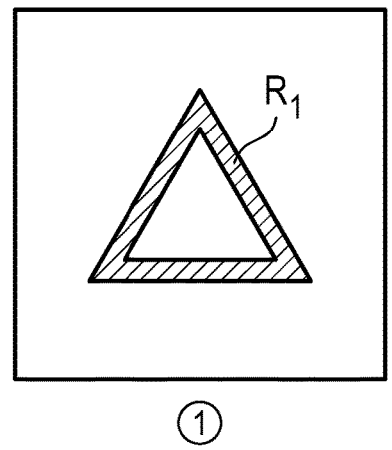
FIG. 4 schematically shows the reference image for the blanks on the first position on the sheet.

FIG. 4 shows an exemplary reference image $R_1$ created by superimposing the scanned images of FIG. 3 and stored in storage 18 for the blank $2_1$. The marked area between the outer lines of the triangle indicates the area within which the contour of a scanned hologram of a supplied printed blank $2_1$ on sheet 1 should be, during an online quality inspection operation of the system, in order to make the comparator 20 come to the conclusion that this particular blank is accepted.

Should the contour of the hologram of an inspected blank $2_1$ be outside the marked area, the comparator 20 classifies this particular blank $2_1$ as being of insufficient quality, and it is discarded.

Figure 5:
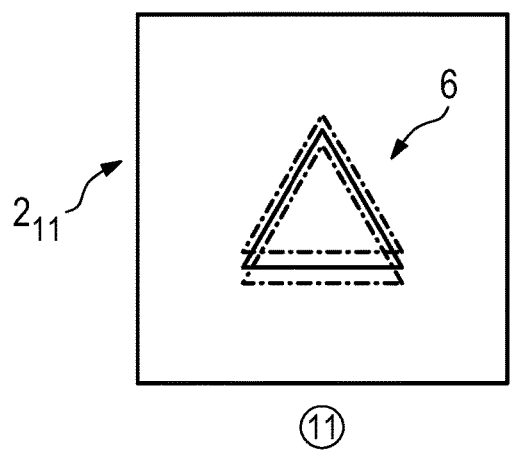
FIG. 5 schematically shows in a superimposed manner the scanned images of a printed exemplary feature for a blank on a second position on the sheet.

FIG. 5 shows a view similar to FIG. 4, but for the blank $2_{11}$. It can be seen that the variations of the position of the holograms 6 here are different than the variations which occur for blank $2_1$. In particular, the holograms printed on blank $2_{11}$ are not rotated with respect to the theoretical "perfect" position but are only slightly displaced.

Figure 6:
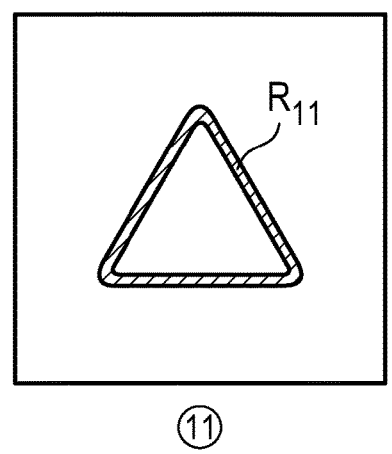
FIG. 6 schematically shows the reference image for the blanks on the second position on the sheet.

As a result, the reference image $R_{11}$ created by superimposing the scanned images $2_{11}$ and shown in FIG. 6, is slightly different from the reference image $R_1$ shown in FIG. 4. For the blank 2 with identification number 11, the area in which the contour of the hologram of a printed blank $2_{11}$ should be in order to be accepted is more narrow as this is the case for the blank $2_1$.

It is to be understood that when the quality inspection system 10 makes a decision whether or not to accept a printed blank $2_n$, it takes into account more details of the printed blank than just the one feature (position of the hologram) which was explained with reference to FIGS. 3 to 6. The individual reference images can contain information on the color (intensity and tone) of prints applied to the blank, on the position of incisions, folded edges and/or creases, the absolute position of certain features and/or the relative position of one feature with respect to one or more second features. In any case, it is important that the reference image which is being used by the comparator 20 is an individual one for each of the blanks which can be found on the sheet 1 being inspected.

The inspection system includes an operator interface where the operator can input that certain specific errors should not result in a blank being discarded. An example of such acceptable error is an ink dot with a diameter of less than 0.2 mm.

The invention claimed is:

1. A method of inspecting the quality of blanks to be processed into packaging material, the method comprising: supplying a carrier with a plurality of blanks;
associating with each blank a respective mark of a plurality of marks, each mark associated with a respective position of the respective blank on the carrier;
obtaining a scanned image of each blank and identifying the scanned image of each blank in accordance with the respective mark;
comparing a first scanned image taken of a first blank at a first position on the carrier with a first reference image of a plurality of reference images, each reference image associated with a specific position on the carrier different from a position on the carrier of every other reference image;
comparing a second scanned image taken of a second blank at a second position on the carrier with a second reference image of the plurality of reference images; and
based on a result of the comparison, accepting or rejecting the respective blank.

2. The method of claim 1, further comprising producing a preliminary reference image based on printing data.

3. The method of claim 1, further comprising generating the reference image in a learning phase by superimposing a plurality of the scanned images of produced blanks which have a good quality.

4. The method of claim 3, further comprising using a pdf file as a master for determining whether or not the blanks have the good quality for being used in creating the reference image.

5. The method of claim 3, further comprising using a master which is a printed blank, for determining whether or not the blanks have the quality for being used in creating the reference image.

6. The method of claim 3, wherein the learning phase is repeated in intervals.

7. The method of claim 1, further comprising using the result of the comparison for identifying problems in the production of the blanks.

8. The method of claim 1, wherein the blank comprises a printed zone.

9. The method of claim 1, wherein the blank comprises a hologram.

10. The method of claim 1, wherein the blank comprises an embossing.

11. The method of claim 1, wherein the blank comprises a folded edge.

12. A quality inspection system comprising:
the inspection system associating a respective mark with each blank of a plurality of blanks of a sheet received, each mark associated with a respective position of the respective blank on the sheet;
a digital imaging unit configured to obtain a scanned image of each blank of the plurality of blanks on the sheet in accordance with the respective mark;
a comparator configured to compare a first scanned image taken of a first blank at a first position on the sheet with a first reference image of a plurality of reference images, each reference image associated with a specific position on the sheet different from a position on the sheet of every other reference image;
the comparator configured to compare a second scanned image taken of a second blank at a second position on the sheet with a second reference image of the plurality of reference images; and
the inspection system configured, based on a result of the comparison, to accept or to reject the respective blank.

* * * * *